No. 864,049. PATENTED AUG. 20, 1907.
G. E. TURNER & H. C. FRICKE.
GAS ENGINE BASE AND SHAFT BEARINGS THEREFOR.
APPLICATION FILED APR. 3, 1907.
2 SHEETS—SHEET 1.
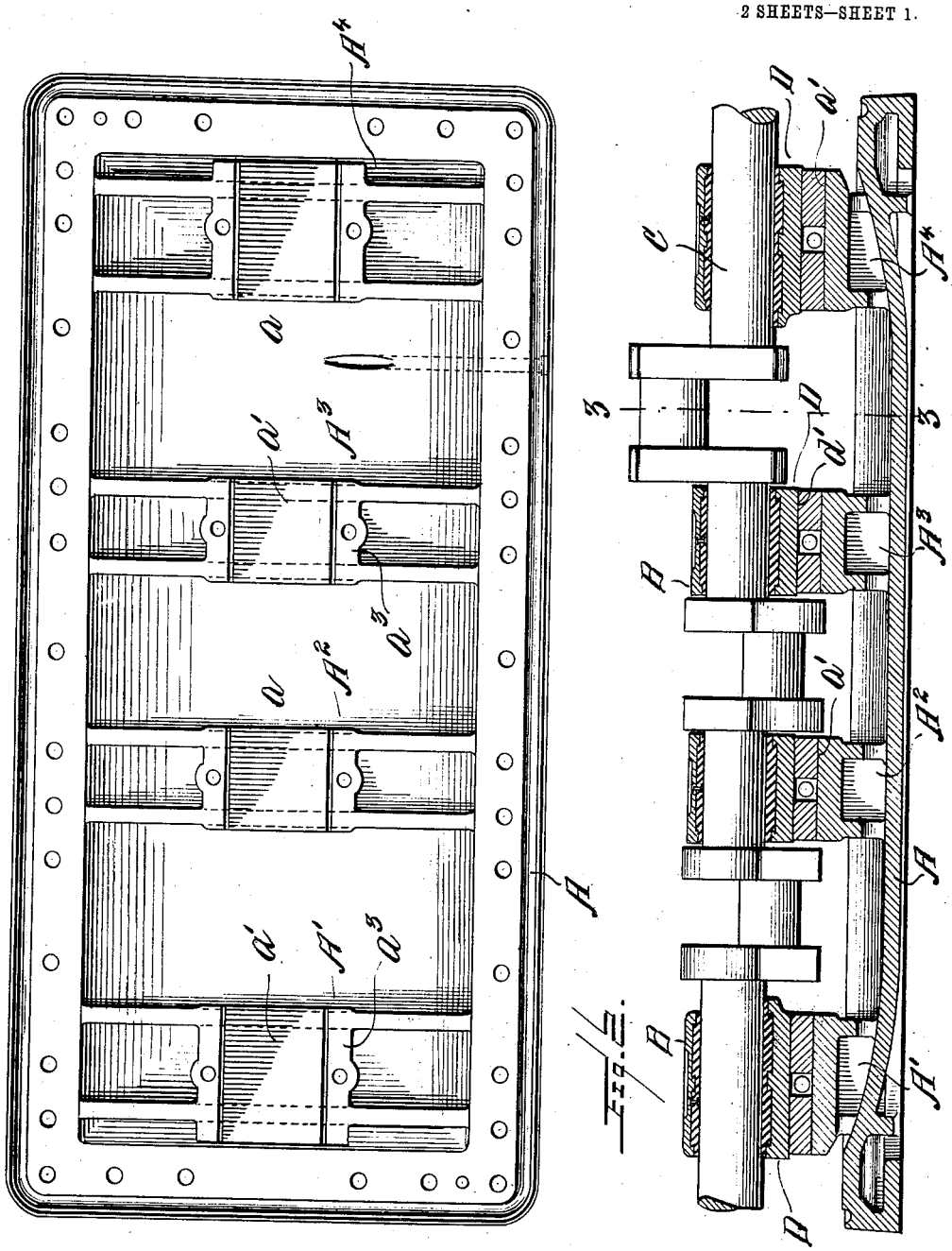

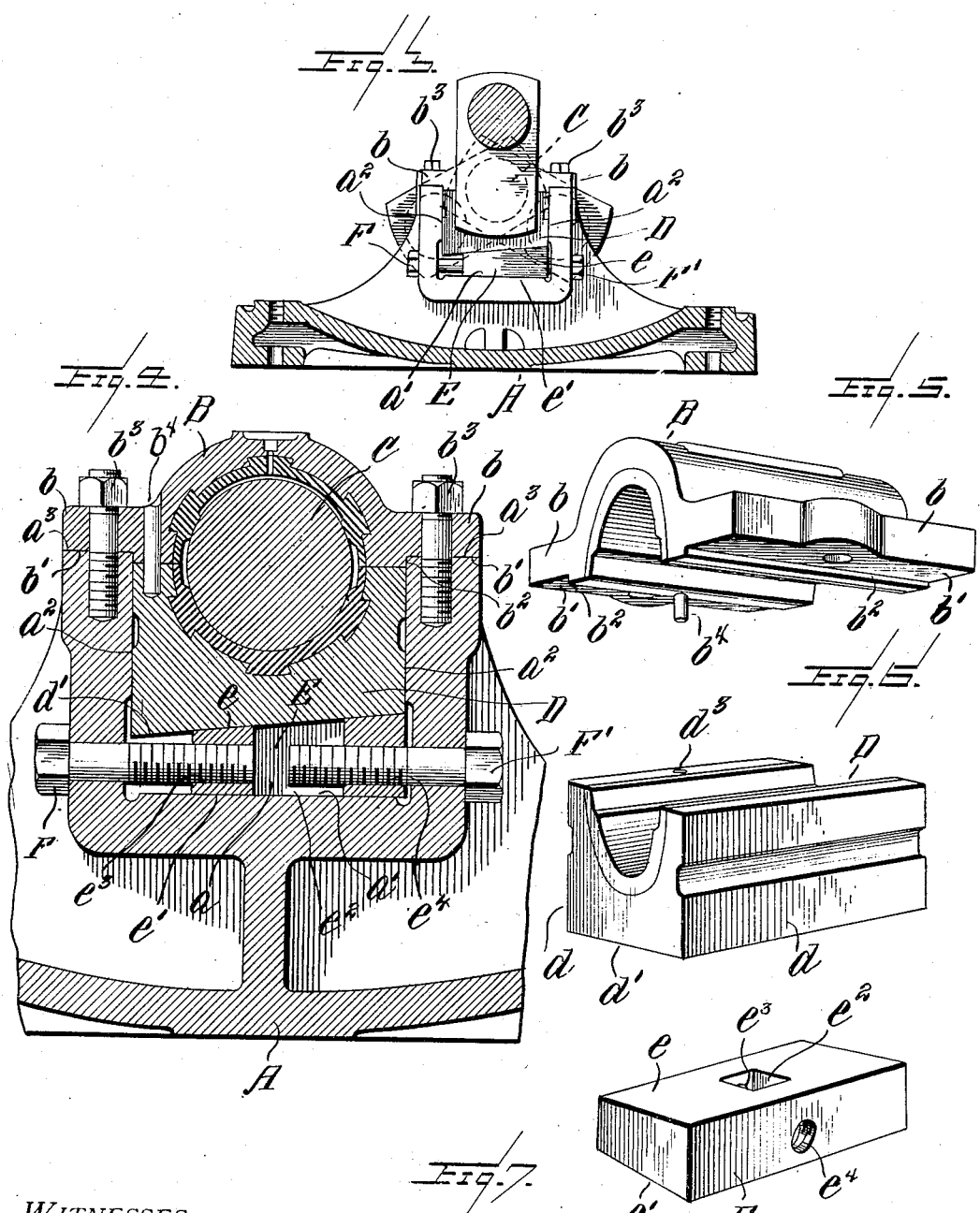

UNITED STATES PATENT OFFICE.

GEORGE E. TURNER AND HARRY C. FRICKE, OF PITTSBURG, PENNSYLVANIA, ASSIGNORS TO TURNER-FRICKE MANUFACTURING COMPANY, OF PITTSBURG, PENNSYLVANIA, A CORPORATION OF PENNSYLVANIA.

GAS-ENGINE BASE AND SHAFT-BEARINGS THEREFOR.

No. 864,049.  Specification of Letters Patent.  Patented Aug. 20, 1907.

Application filed April 3, 1907. Serial No. 366,204.

*To all whom it may concern:*

Be it known that we, GEORGE E. TURNER and HARRY C. FRICKE, citizens of the United States, residing at Pittsburg, in the county of Allegheny and State of Pennsylvania, have invented certain new and useful Improvements in Gas-Engine Bases and Shaft-Bearings Therefor; and we do hereby declare the following to be a full, clear, and exact description of the invention, such as will enable others skilled in the art to which it appertains to make and use the same.

In the manufacture and operation of engines, and particularly of vertical gas or other explosive engines of the multi-cylinder type, much difficulty is experienced first in securing the perfect alinement of the crank shaft in the engine base, and second in securing necessary adjustment of the crank shaft bearings after they have become worn. Where as in almost all high powered explosive engines three or more bearings are provided for the crank shaft it is naturally difficult to secure their exact alinement, even by the most skilful mechanics, and as these engines ordinarily are provided with a heavy balance wheel on each end of the crank shaft, the bearings wear unequally so that after a time adjustment and re-alinement of the same becomes necessary to prevent breaking the crank shafts.

In practice we have found that in the use of vertical cylinder explosive engines, there is practically no wear upon the interior bearing surfaces of the caps or upper halves of the crank shaft bearings, as the weight of the shaft, and balance wheels, and the thrust of the pistons upon the crank, act in a downward direction. It, therefore, follows that if the caps or upper halves of the crank shaft bearings are properly alined they afford an accurate guide for the original alinement of the shaft, and for the adjustment and re-alinement of the bearings when worn.

Having this in mind our invention consists in certain novel features hereinafter described, reference being had to the accompanying drawings which illustrate one form in which we have contemplated embodying our invention, and said invention is fully disclosed in the following description and claims.

According to our invention, we provide the engine base with a series of pillow blocks, preferably three or more, which are planed or milled simultaneously so as to provide surfaces exactly in alinement for the reception of the caps or upper halves of the bearings which are rigidly clamped to the pillow blocks, and to receive a vertically adjustable block containing the lower half of the bearing, and each pillow block is provided with means for adjusting the lower bearing section or block vertically. The caps and blocks before mentioned are then formed, babbitted or bushed and bored so as to be absolutely identical, in form, and are placed in engagement with said pillow blocks. It will be seen therefore that the original alinement of the shaft can be secured by even an unskilled mechanic, by placing the shaft in the bearings and forcing the lower halves of the bearings upward until the shaft is forced firmly in contact with the caps, and then slacking them minutely, to prevent too great friction, and it will be apparent further that in case the bearings or any of them become worn, the perfect alinement of the shaft and adjustment of the bearings, can be secured by an unskilled mechanic by the same simple proceeding.

Our invention also contemplates certain details of construction hereinafter described.

Referring to the accompanying drawings, Figure 1 is a plan view of an engine base for a three cylinder, vertical explosive engine, having our present invention embodied therein, showing the pillow blocks, the bearings being removed. Fig. 2 is a vertical longitudinal section of the engine base showing the crank shaft and bearings in position. Fig. 3 is a vertical transverse section of the base on line 3—3 of Fig. 2. Fig. 4 is an enlarged vertical transverse section through one of the pillow blocks, its bearing and the crank shaft. Fig. 5 is a detail perspective view of one of the caps. Fig. 6 is a detail perspective view of one of the vertically adjustable bearing blocks. Fig. 7 is a detail perspective view of one of the wedges which we employ to adjust the blocks vertically.

Referring to the drawings, A represents the engine base which in this instance is formed separately from the crank case, although it may be formed integrally therewith if desired. The base A is provided with four pillow blocks $A'$, $A^2$ $A^3$, $A^4$ arranged in position to support the four bearings for the crank shaft C. Each of said pillow blocks is provided with a rectangular recess $a$, open at the top and having a bottom face $a'$, lateral interior faces $a^2$ $a^2$ and top edges, or faces $a^3$ $a^3$, which are absolutely true, and in alinement with each other. This is accomplished by placing the engine base on a planer or milling machine and dressing the faces $a'$, $a^2$ and $a^3$ of all the pillow blocks simultaneously as will be readily understood.

Each pillow block is provided with a bearing cap B shown in detail Fig. 5, the lateral flanges $b$ of which are planed on their under sides as at $b'$ $b'$ to fit upon the top faces $a^3$ $a^3$ of the pillow block, and are provided adjacent to the central bearing portion with downwardly extending shoulders, $b^2$ which fit exactly between the inner faces $a^2$ $a^2$ of the pillow blocks, thus determining the positions of the caps, and preventing their lateral displacement. The caps B are rigidly clamped to the tops of the pillow blocks by bolts $b^3$.

Each of the pillow blocks is provided with a bearing block D shown in detail Fig. 6, in which the lower part of the bearing aperture is formed, said blocks having their opposite faces $d\ d$ perfectly true and parallel, and the width of the block D is such that it fits exactly between the vertical interior faces $a^2\ a^2$ of the recess in the pillow block. The bottom face $d'$ of the bearing block is laterally inclined or beveled, to engage the similarly beveled or inclined face $e$ of a wedge E which we employ in connection therewith for securing the vertical adustment of the block D.

Each of the wedges E, has a bottom face $e'$, perpendicular to its lateral edges, for engaging the bottom $a'$ of the pillow block recess. The wedge is preferably cast with a central aperture $e^2$, and a threaded aperture extends from each of the lateral edges to said aperture $e^2$, the threaded apertures being indicated at $e^3$ and $e^4$.

F represents an adjusting screw extending through a hole in one side wall of the pillow block recess and engaging the threaded aperture $e^4$ of the wedge, and F' represents a locking screw extending through the opposite side wall and engaging the threaded aperture $e^3$ of the wedge.

The caps B, and blocks D, are babbitted, or bushed in any desired manner and are bored in such manner that they are absolutely coaxial. This result may be effected by alining the blocks, and caps on a boring machine, and boring them all with a single operation of the boring tool, or it may be accomplished by placing them in a jig or jigs, and boring them separately.

When the parts of the bearings are assembled, the wedges E are placed in the recesses A, so as to allow the blocks D to be placed on top of them in their lowest positions. The crank shaft is then placed in position upon the blocks D and the caps B are bolted in place. In order to prevent the blocks D from working endwise, in the pillow blocks, without interfering with their vertical movements, we drill a hole vertically through each cap B into its corresponding block D, and insert a dowel pin in the one, which extends into the aperture of the other. In this instance the cap B is provided with a dowel $b^4$ extending into the dowel aperture $d^3$ in the block D. As the block D is rigidly held from lateral movement by the walls of the recess in the pillow block a single dowel is all that is needed. The parts having been assembled as before described, the workman who need not be a skilled mechanic, sets up the screws F previously slacking off the screws F', if they are in place, thus moving the wedges E laterally and forcing the blocks D vertically, carrying the shaft with them, until the shaft is forced into engagement with the bearing portions of the cap B, when the wedges cannot be drawn further, the caps serving as stops or guides to limit the point to which the separate bearings can be adjusted or tightened. Each of the screws F is then slacked off exactly the same amount, say a quarter of a turn, to prevent binding the shaft, and the locking screws F' are then turned up so as to withdraw the wedges to the extent permitted by the screws F, and lock the wedges, and screws F rigidly against accidental displacement. In this manner the perfect alinement of the crank shaft in its bearing is secured.

After the engine has been run long enough to cause wear in some or all of its bearings, the bearings can be quickly and readily alined by any one, by slacking off the lock screws F', then tightening the wedges by means of the screws F, until each bearing block is forced up as far as it will go, and the shaft is again alined against the bearing portions of caps D, slacking off the screws F equally, as by a quarter turn backward, and then setting up the lock screws F', when the shaft will be in as perfect alinement as when the engine was originally assembled.

What we claim and desire to secure by Letters Patent is:—

1. The combination with an engine base provided with a plurality of pillow blocks, each provided with a central bearing recess open at top and ends, said pillow blocks having their top faces on opposite sides of said recesses, and the vertical walls of said recesses exactly in line, a plurality of bearing caps, each having a central shaft engaging portion, and lateral portions having their lower faces engaging the top faces of said pillow blocks and depending opposite shoulders fitting between the walls of the pillow block recess, the shaft engaging portions of said caps being coaxial, bolts rigidly connecting said caps to said pillow blocks, a bearing block in each of said recesses having parallel plane lateral faces fitted between the walls of said recesses and having shaft engaging portions on their upper faces, independent devices connected with each pillow block for adjusting the bearing block thereof vertically said caps and bearing blocks having the one a vertical projection engaging a vertical aperture in the other to prevent the longitudinal movement of said bearing blocks, substantially as described.

2. The combination with an engine base provided with a plurality of pillow blocks each provided with a vertically disposed bearing recess open at the top and ends, the top faces of said pillow blocks on opposite sides of said recesses and the lateral and bottom faces of said recesses, being exactly in line with each other, a bearing cap for each pillow block rigidly secured thereto, and provided with faces engaging the top faces of the pillow block and opposite shoulders fitting between the lateral faces of its recess, the shaft engaging portions of said caps being exactly coaxial, vertically movable blocks each having parallel lateral faces fitting in the recesses of said pillow blocks between the lateral faces thereof, said blocks having coaxial shaft engaging portions on their upper faces, means for vertically adjusting each of said bearing blocks, and a vertical projection extending downwardly from each of said caps, and engaging an aperture in its adjacent bearing block, substantially as described.

In testimony whereof we affix our signatures, in the presence of two witnesses.

GEORGE E. TURNER.
HARRY C. FRICKE.

Witnesses:
J. C. RODGERS,
BEATRICE FITZGERALD.